(12) United States Patent
Featherstone et al.

(10) Patent No.: US 11,192,765 B1
(45) Date of Patent: Dec. 7, 2021

(54) SYSTEMS AND METHODS FOR LANYARD ATTACHMENT DETECTION ON AN AERIAL DEVICE

(71) Applicant: Altec Industries, Inc., Birmingham, AL (US)

(72) Inventors: Andrew W. Featherstone, Country Club, MO (US); Jordan Desmarais, Smithville, MO (US); Marques King, Saint Joseph, MO (US); Bryn Winger, Saint Joseph, MO (US); David Lindquist, Cameron, MO (US); Timothy M. Smiley, Wake Forest, NC (US); Connor Tripp, Durham, NC (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 17/333,335

(22) Filed: May 28, 2021

(51) Int. Cl.
*B66F 17/00* (2006.01)
*G01V 8/24* (2006.01)

(52) U.S. Cl.
CPC .............. *B66F 17/006* (2013.01); *G01V 8/24* (2013.01)

(58) Field of Classification Search
CPC ................................ B66F 17/006; G01V 8/24
See application file for complete search history.

(56) References Cited

U.S. PATENT DOCUMENTS

| | | | |
|---|---|---|---|
| 10,549,974 B2 * | 2/2020 | McKinney | B66F 11/04 |
| 10,908,228 B1 * | 2/2021 | Gorghuber | G08C 19/00 |
| 10,913,643 B1 * | 2/2021 | Mourlam | B66F 17/006 |

* cited by examiner

*Primary Examiner* — Giovanni Astacio-Oquendo
(74) *Attorney, Agent, or Firm* — Erise IP, P.A.

(57) ABSTRACT

Systems and methods for detecting attachment of a lanyard at a utility platform of an aerial device are described. In some embodiments, a lanyard attachment device is disposed on a utility platform. The lanyard attachment device may comprise a sensor detecting when a lanyard is attached to the lanyard attachment device. In some embodiments, the utility platform is separated from a base of the aerial device by a dielectric gap, and a light signal is indicative of the state of the lanyard attachment device. Furthermore, anti-tie-down functionality may be used to detect error or tampering of the lanyard attachment device.

20 Claims, 11 Drawing Sheets

SYSTEMS AND METHODS FOR LANYARD ATTACHMENT DETECTION ON AN AERIAL DEVICE

BACKGROUND

1. Field

Embodiments of the invention relate to detecting lanyards. More specifically, embodiments of the invention relate to detecting lanyard attachment in a utility platform of an aerial device.

2. Related Art

Typically, standard aerial devices provide lanyard attachment devices at utility platforms such that operators in the utility platform may attach themselves to the utility platform. The lanyards provide a mechanism that, in a situation where the operator may fall from the utility platform, slows the operator to a stop such that the operator does not fall to the ground. Some aerial devices also work on high voltage power lines. These aerial devices may maintain electrical insulation, or a dielectric gap, between the utility platform and the supporting vehicle below. The utility platforms may provide a secure anchor for lanyards; however, typical aerial devices do not provide reliable communication indicative of attachment of the lanyard to lower components of the aerial device such that operations of the utility platform can be limited. Furthermore, typical aerial devices do not provide reliable communication indicative of the attachment of lanyards across a dielectric gap of insulated aerial devices. Furthermore, typical lanyard attachment systems that may have a detection device do not provide anti-tie down functionality to limit aerial device operations when it is detected that a lanyard detection device is in error or has been tampered with.

What is needed are systems and methods that provide lanyard attachment detection systems for aerial devices. Furthermore, what is needed are systems and methods that provide lanyard detection devices across a dielectric gap. Further still, what is needed are systems and methods for providing anti-tie-down functionality to the lanyard attachment devices on the aerial devices.

SUMMARY

Embodiments of the invention solve the above-mentioned problems by providing systems and methods for detecting lanyard attachment at a utility platform and transmitting a signal indicative of the attachment to a base of an aerial device such that certain operations of the utility device may be limited. Furthermore, in some embodiments, anti-tie-down functionality may be provided that limits operation of the aerial device based on detection of error or tampering of the lanyard attachment device under certain aerial device conditions and modes.

A first embodiment of the invention is directed to a system for detecting an attachment of a lanyard at a utility platform of an aerial device, the system comprising a processor and a lanyard attachment device. The lanyard attachment device comprises a moveable element and a sensor connected to the moveable element for detecting a state of the moveable element, wherein the moveable element is in a first state when the lanyard is not attached to the lanyard attachment device, and the moveable element is in a second state when the lanyard is attached to the lanyard attachment device, and one or more non-transitory computer-readable media storing computer-executable instructions that, when executed by the processor, perform a method of detecting the state of the moveable element. The method comprises the steps of receiving a first signal from the sensor indicative of the state of the moveable element and transmitting a second signal to at least one actuator for controlling flow of a hydraulic fluid to control the utility platform based on the first signal indicative of the state of the moveable element.

A second embodiment of the invention is directed to a method for detecting attachment of a lanyard at a utility platform of an aerial device, the method comprising the steps of receiving a first signal at a base of the aerial device from the utility platform, wherein the first signal is indicative of a state of a moveable element disposed at the utility platform, wherein the moveable element is in a first state when the lanyard is not attached to a lanyard attachment device and the moveable element is in a second state when the lanyard is attached to the lanyard attachment device, and transmitting a second signal to at least one actuator for controlling flow of a hydraulic fluid to control the utility platform based on the first signal indicative of the state of the moveable element.

A third embodiment of the invention is directed to a system for detecting attachment of a lanyard at a utility platform of an aerial device, the system comprising a processor and a lanyard attachment device. The lanyard attachment device comprises a moveable element, and a first sensor connected to the moveable element for detecting a moveable element state, wherein the moveable element is in a first state when the lanyard is not attached to the lanyard attachment device and the moveable element is in a second state when the lanyard is attached to the lanyard attachment device. The lanyard attachment device also comprises a single handle controller, a second sensor detecting a single handle controller state, and one or more non-transitory computer-readable media storing computer-executable instructions that, when executed by the processor, perform a method of detecting the moveable element state and the single handle controller state. The method further comprises the steps of receiving a first signal from the first sensor indicative of the moveable element state, receiving a second signal from the second sensor indicative of the single handle controller state, and transmitting a third signal to at least one actuator for controlling flow of a hydraulic fluid to control the utility platform based on the first signal and the second signal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
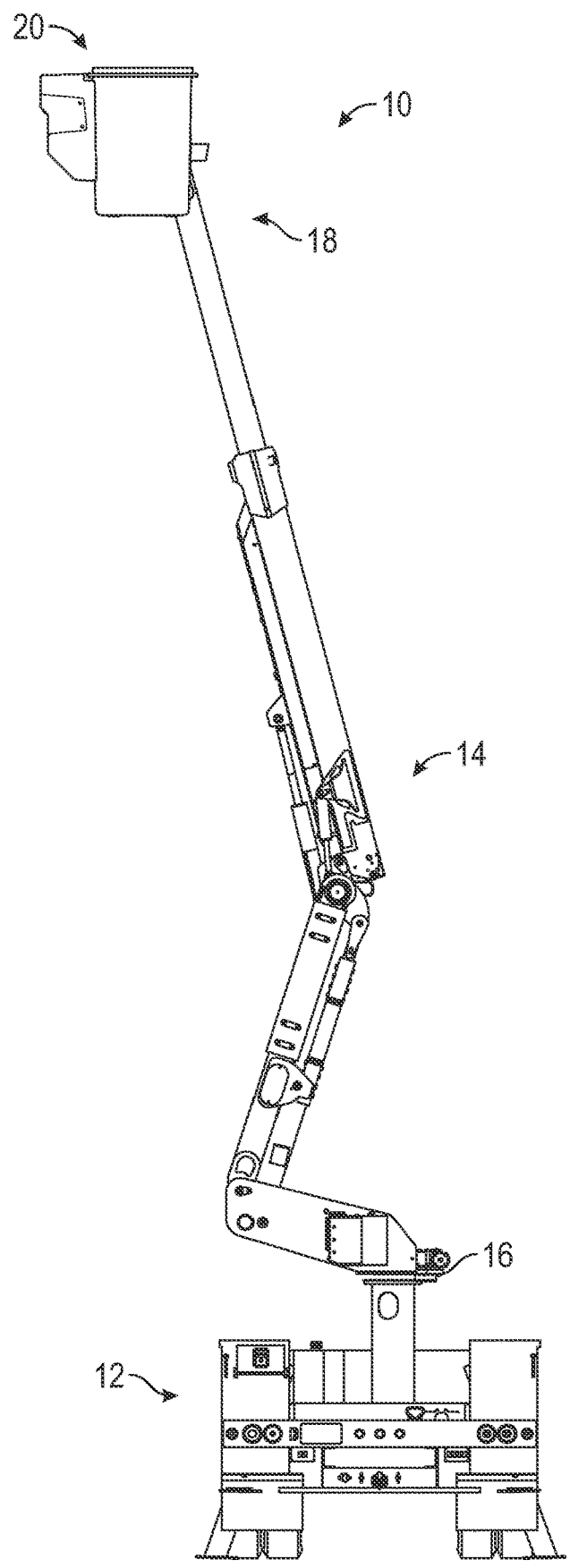
FIG. 1 depicts an insulating aerial device for some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to detecting attachment of a lanyard at or near a utility platform of an aerial device. In some embodiments, the lanyard is a device that attaches to the operator in the utility platform and connects the operator to the aerial device. In the event that the operator falls from the utility platform, the lanyard provides an attachment to the aerial device to prevent the operator from falling to the ground. In some embodiments, the lanyard detection unit may comprise a lever that can selectively be placed in two states: a first state being open (when the lanyard is not attached) and the second state being closed (when the lanyard is attached). Furthermore, the lanyard detection unit may comprise a sensor that detects the state of the lever and sends a signal indicative of the state of the lever to a processor for controlling operations of the aerial device based on the state of the lever. In some embodiments, the lanyard detection unit is further equipped with an anti-tie down system for detecting when the lanyard detection unit is in error or has been tampered with. Furthermore, in some embodiments, a manual override system is provided to override the limited operations of the aerial device based on the state of the lanyard detection unit.

Turning first to FIG. 1, aerial device 10 for some embodiments of the invention is depicted. Aerial device 10 may be attached to utility vehicle 12, as shown. In some embodiments, aerial device 10 comprises boom assembly 14, upper boom section 18, and utility platform 20. Additionally, aerial device 10 comprises turntable 16 disposed on utility vehicle 12, as shown. As aerial device 10 is operated near electrically powered cables, in some embodiments, utility platform 20 and boom assembly 14 comprise insulating material for insulating aerial device 10. Furthermore, any electrical components disposed in the utility platform and on boom assembly 14 may be self-contained and separate from the electrical components of utility vehicle 12. As such, a dielectric gap is created between utility platform 20 and utility vehicle 12. In some embodiments, utility vehicle 12 may generally be referred to as a base, and may be any of a vehicle, a crane, a platform, a truck bed, a mechanical tree trimming apparatus, a hydraulic lift, or any other base capable of supporting boom assembly 14 and utility platform 20.

In some embodiments, an operator may be positioned in utility platform 20 for performing work on or near high-power lines. The operator may access upper controls disposed on utility platform 20 as well as hydraulic tools for performing the work. In some embodiments, the operator in utility platform 20 may move to various positions using the upper controls. Furthermore, lower controls may be utilized at the base of aerial device 10 such as at utility vehicle 12 and at turntable 16. The location and the layout of the aerial device controls is provided in FIGS. 5A-5C and described in detail below. The operator may utilize a lanyard to prevent the operator from falling to the ground if the operator falls from utility platform 20 while performing the work. The lanyard detection unit described in embodiments herein may limit operations of aerial device 10 and provide warnings to the operator and to any ground crew of the state of aerial device 10 and the state of the lanyard detection unit.

Figure 2A:
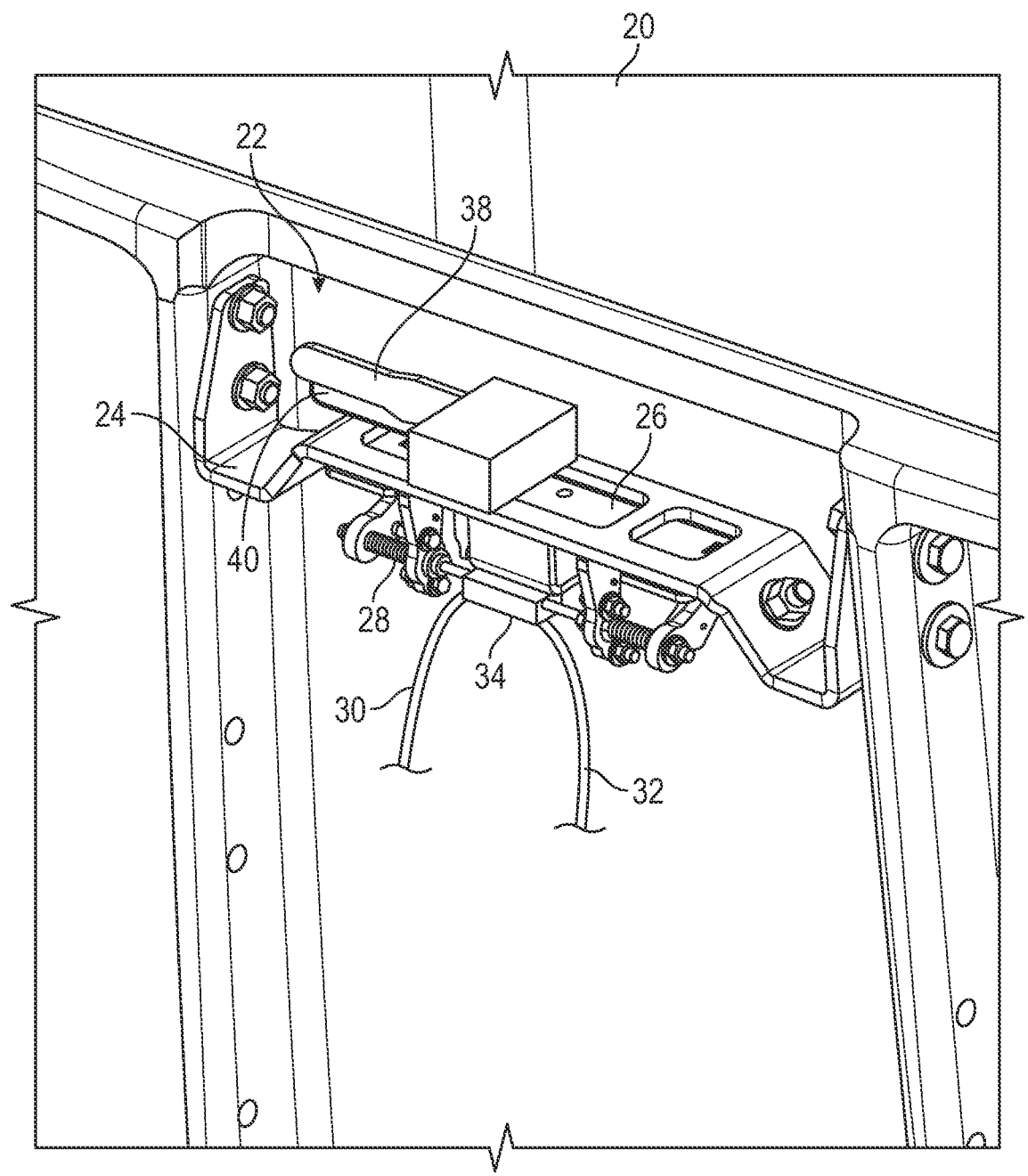
FIG. 2A-2B depict a first embodiment of a lanyard detection unit for attachment to a utility platform.

FIG. 2A depicts an embodiment of lanyard detection unit 22 attached to utility platform 20. In some embodiments, lanyard detection unit 22 comprises a brace 24 attaching lanyard detection unit 22 to utility platform 20 between two ribs. Lanyard detection unit 22 can detect when a lanyard 36 is attached to the platform by an attachment mechanism, such as lanyard clip 37. Lanyard detection unit 22 includes a mechanical part that is moved from a first state to a second state when the attachment mechanism is engaged. Furthermore, in some embodiments, lanyard detection unit 22 comprises lever 26 that may be connected to spring 28 for controlling the state of lever 26. In some embodiments, lever 26 may be any moveable element capable of moving from a first position when a force is applied and returning to the first position caused by a spring or other restoring element. Movable element may be, for example, a plate, a spring, a compressible component that may be made of rubber or other flexible materials, a latch, or a curved element. In some embodiments, spring 28 may cause the restoration force for the moveable element (e.g., lever 26). Spring 28 may be any restoring element such as, for example, an electromechanical actuator, a hydraulic actuator, or a mechanical actuator, such as a compressible component that may be made of rubber or other flexible materials. In some embodiments, spring 28 may be a plurality of springs. For example, spring 28 may comprise two springs, as depicted in FIG. 2A. Furthermore, lanyard detection unit 22 may comprise sensor 34 which may be connected to lever 26 and detect the state of lever 26. In some embodiments, lever 26 may be held in place, or in a particular state, by spring 28. When an operator of aerial device 10 attaches lanyard 36, as depicted in FIG.

2B, lever 26 may be depressed. As lever 26 is depressed, the movement of lever 26 may be detected by sensor 34. Sensor 34 may then send a signal indicative of the state of lever 26. As such, the signal may be indicative of lanyard 36 being attached to lanyard detection unit 22. In some embodiments, a send cable 30 carries a light signal from a transceiver at the utility vehicle 12 or the turntable 16 and the light signal passes through sensor 34. If the light signal is blocked, no return signal is sent via return cable 32. If the light signal is not blocked, the light signal continues on via return cable 32 back to the transceiver. The light signal may be indicative of the state of lever 26 and, consequently, if lanyard 36 is attached. The light signal transmission and detection logic is discussed in more detail below. In some embodiments, the transceiver may send and receive electrical signals by wire, or, in some embodiments, the transceiver may be fiber optic transceiver 534 depicted in FIG. 5B.

Figure 2B:
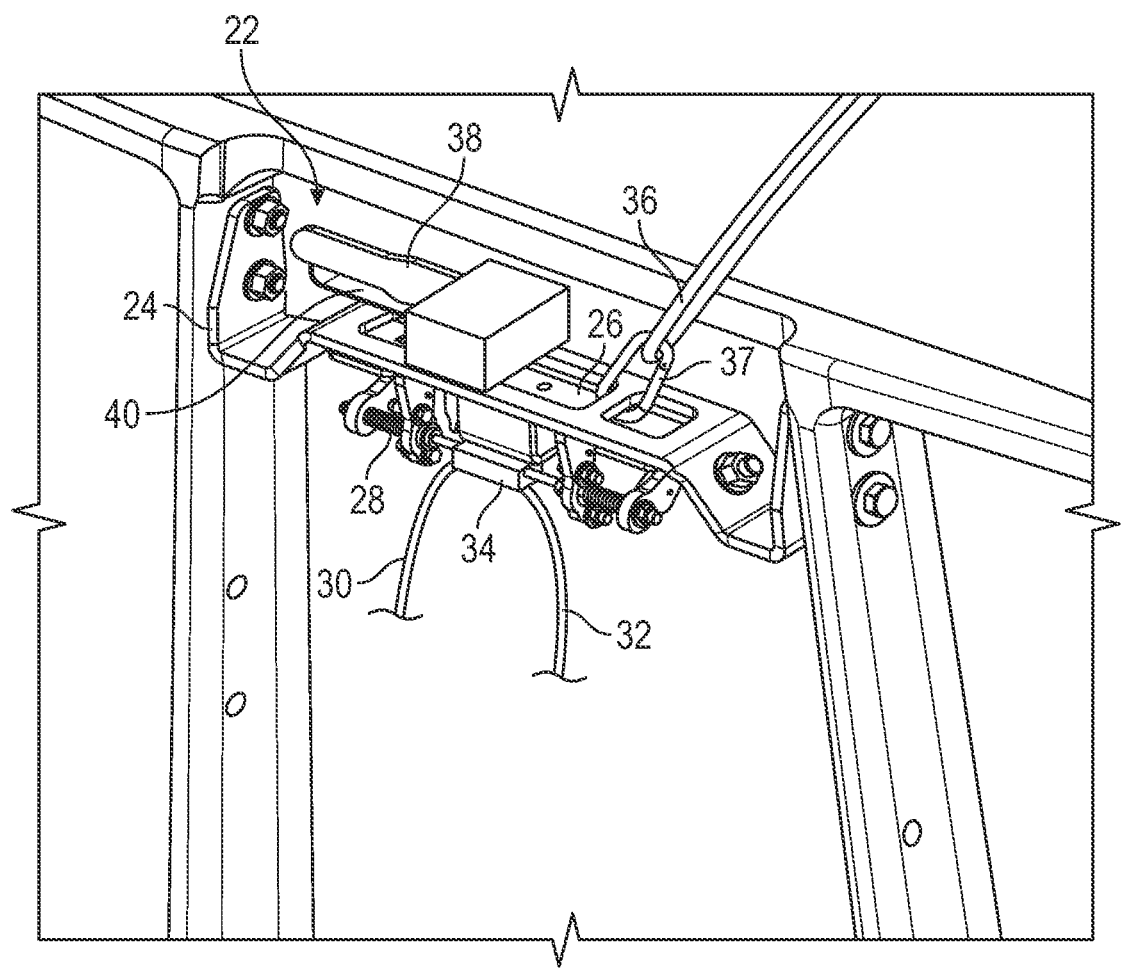

FIG. 2B depicts lanyard detection unit 22 with lanyard 36 attached. In some exemplary embodiments, the operator may press lever 26 downward to attach lanyard 36 to lanyard detection unit 22. In some embodiments, lanyard 36 may comprise lanyard clip 37 for attaching to the lanyard detection unit 22. Lanyard clip 37 may be a bolt clip, a carabiner, a snap clip, or any other type of clip or attachment mechanism that may be attached to lanyard detection unit 22 to secure the operator to the utility platform 20. Spring 28 may hold lever 26 in a first state indicative of lanyard 36 not being attached via lanyard clip 37. When lanyard 36 is attached, spring 28 is actuated acting on sensor 34. Sensor 34 then detects the actuation and sends a signal indicative of the attachment of lanyard 36. In some embodiments, instead of pressing lever 26 downward, spring 28 may be attached to lanyard detection unit 22 and lanyard detection unit 22 may be pulled toward the operator and sensor 34 may detect the movement. In some embodiments, any additional lever or lanyard anchor may be attached to lanyard detection unit 22 that may cause actuation of lever 26 or actuation of lanyard detection unit 22 such that the actuation may be detected by sensor 34.

Figure 5A:
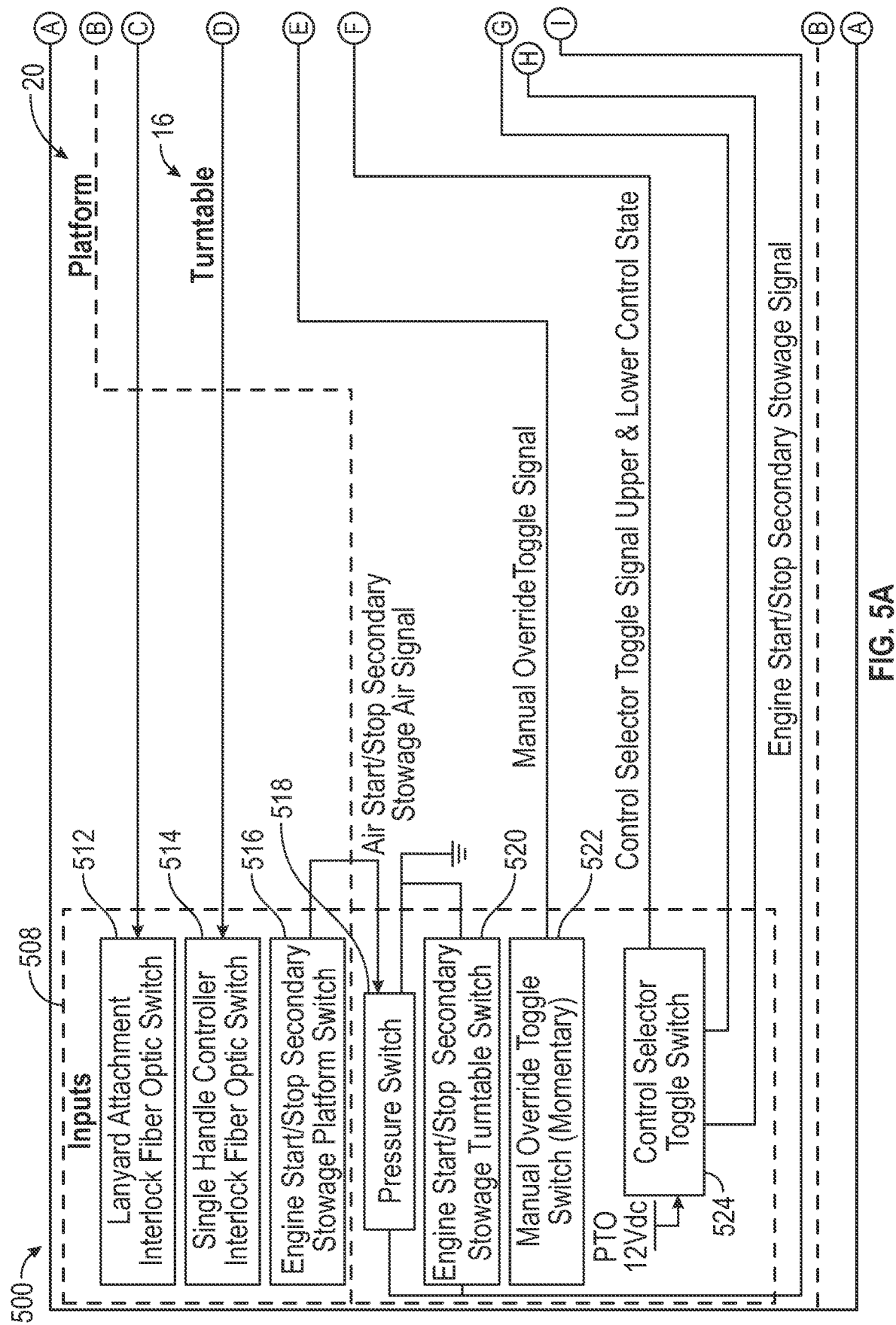
FIGS. 5A-5C depict a flow diagram for implementing systems and methods of the lanyard detection unit on an aerial device of any of the embodiments.

In some embodiments, sensor 34 may send a light signal through fiber optic cables (e.g., send cable 30 and return cable 32) to the base comprising utility vehicle 12 and turntable 16 of aerial device 10. When utility platform 20 is electrically isolated and/or insulated from the base, it may be desirable to user fiber optic communication between utility platform 20 and the base. For example, a light emitting diode (LED), or any other type of light source, may be positioned at the base of aerial device 10. The light signal may pass through send cable 30, which in some embodiments may be a fiber optic cable. The light signal may then pass to utility platform 20 via sensor 34 at lanyard detection unit 22. If the light signal passes sensor 34, the light signal returns to the base where the light signal is detected. In some embodiments, when lever 26 is moved into the second state (i.e., lanyard attached) a switch interior to the sensor which, in some embodiments may be lanyard attachment interlock fiber optic switch 512 depicted in FIG. 5A, is actuated, blocking the light signal such that the optical transceiver does not receive the return light signal. Consequently, the light signal is blocked and therefore, the lanyard 36 is attached. Alternatively, the light signal may be blocked in the first state of lever 26 and allowed to pass to the fiber optic transceiver 534 in the second state. As long as the logic in the processor is switched, the operation of aerial device 10 may be similarly controlled. The electrical processes for controlling aerial device 10 are discussed in more detail in reference to FIGS. 5A-5C below.

In some embodiments, the operation of aerial device 10 is further controlled by single handle controller interlock functionality. Single handle controller 38 may comprise single handle controller interlock fiber optic switch 514 depicted in FIG. 5A and receive and/or transmit a light signal to the base where the light signal is indicative of engagement or disengagement of single handle control interlock lever 40. In some embodiments, single handle control interlock lever 40 works similarly to sensor 34 described above. The light signal from single handle controller 38 may be received at turntable 16 by fiber optic transceiver 534 and a signal indicative of the state of single handle control interlock lever 40 may be transmitted to control module 536 for controlling settings of aerial device 10. In some embodiments, lanyard detection unit 22 must indicated that lanyard 36 is attached and/or single handle control interlock lever 40 must be engaged for motion of boom assembly 14 and utility platform 20 to be fully operational. Consequently, if either lanyard attachment interlock fiber optic switch 512 or single handle controller interlock fiber optic switch 514 is not satisfied, motion of utility platform 20 may be limited.

In some embodiments, a control selector switch 524 controls the operation of upper and lower controls by activating upper control selector solenoid 542 and lower control selector solenoid 544 to provide hydraulic fluid to the corresponding parts. The control selector switch 524 may be disposed at turntable 16 or any other location of aerial device 10. If the control selector switch 524 is in a first state, a power take off (PTO) 12-volt switch 528 is actuated to send power to the upper control selector solenoid 542 allowing pilot oil, or any other hydraulic fluid, to flow to the platform and, thus, allowing upper controls to control motion of boom assembly 14 and utility platform 20. In some embodiments, activating upper control selector solenoid 542 to the first state may also prevent utility platform 20 from being controlled by a lower control station positioned at the base. As such, in this scenario, only operators in utility platform 20 may move utility platform 20 without activating an override at the base. In some embodiments, if upper control selector solenoid 542 is in a second state, or an OFF position, utility platform 20 may be controlled by the lower controls but, in some embodiments, not by the upper controls positioned at utility platform 20. If both the upper and lower controls are on, control selector switch 524 error logic triggers a continuous error and may alert both the operator in utility platform and the ground crew.

In some embodiments, hydraulic operation of utility platform tools are maintained while the upper controls are disabled. Exemplary utility platform tools may be hydraulic and electric tools, jib tools, and any other tools that may be operated at utility platform 20. In some embodiments, actuation of utility platform 20, such as rotate and tilt, may be limited based on the state of lanyard detection unit 22 and/or single handle control interlock lever 40. Utility platform tools may be powered by a hydraulic motor and electrical power sources disposed at the boom tip and electrically separated from ground components at the base. As such, in some embodiments, the operator may rotate and tilt the utility platform and use the utility platform tools while lanyard 36 is not attached and while single handle control interlock lever 40 is not engaged. Therefore, the upper controls may be disabled, preventing the operator in utility platform 20 from operating turntable 16 and boom assembly 14; however, the operator may perform work duties using the utility platform tools. In some embodiments, rotate and tilt operation of utility platform 20 may also be disabled.

In some embodiments, the lower controls may not be affected by lanyard detection unit 22 and the single handle controller 38. When control selector switch 524 is in the OFF configuration, full operation may be provided to the lower controls. As such, any ground or turntable positioned operator may control operation of aerial device 10. In the lower controls configuration of control selector switch 524, the operator in utility platform 20 may not control the machine regardless of the state of the lanyard detection unit 22 and the state of the single handle control interlock lever 40 without operating an override.

Figure 3A:
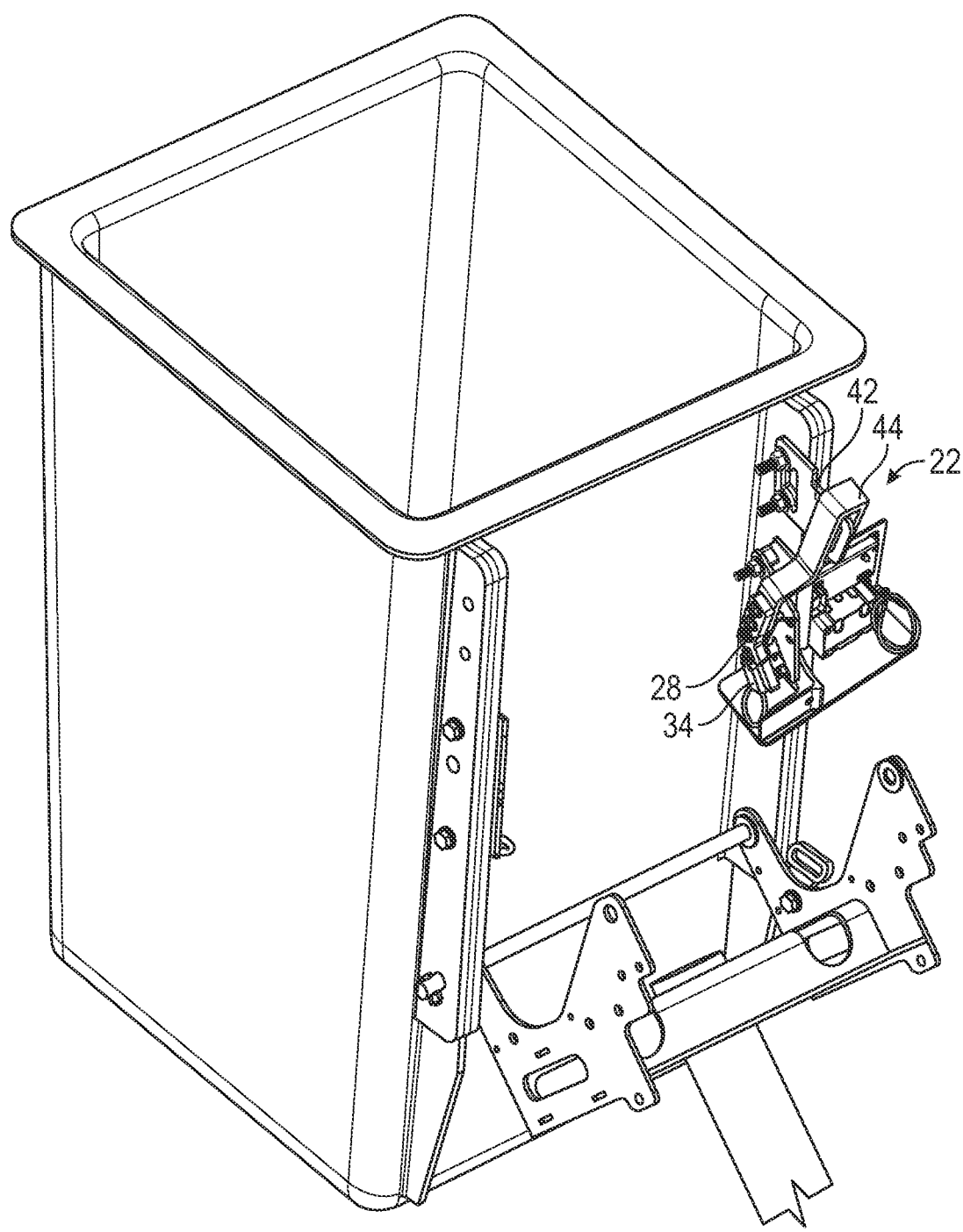
FIG. 3A-3B depict a second embodiment of a lanyard detection unit for attachment to a utility platform.
Figure 3B:
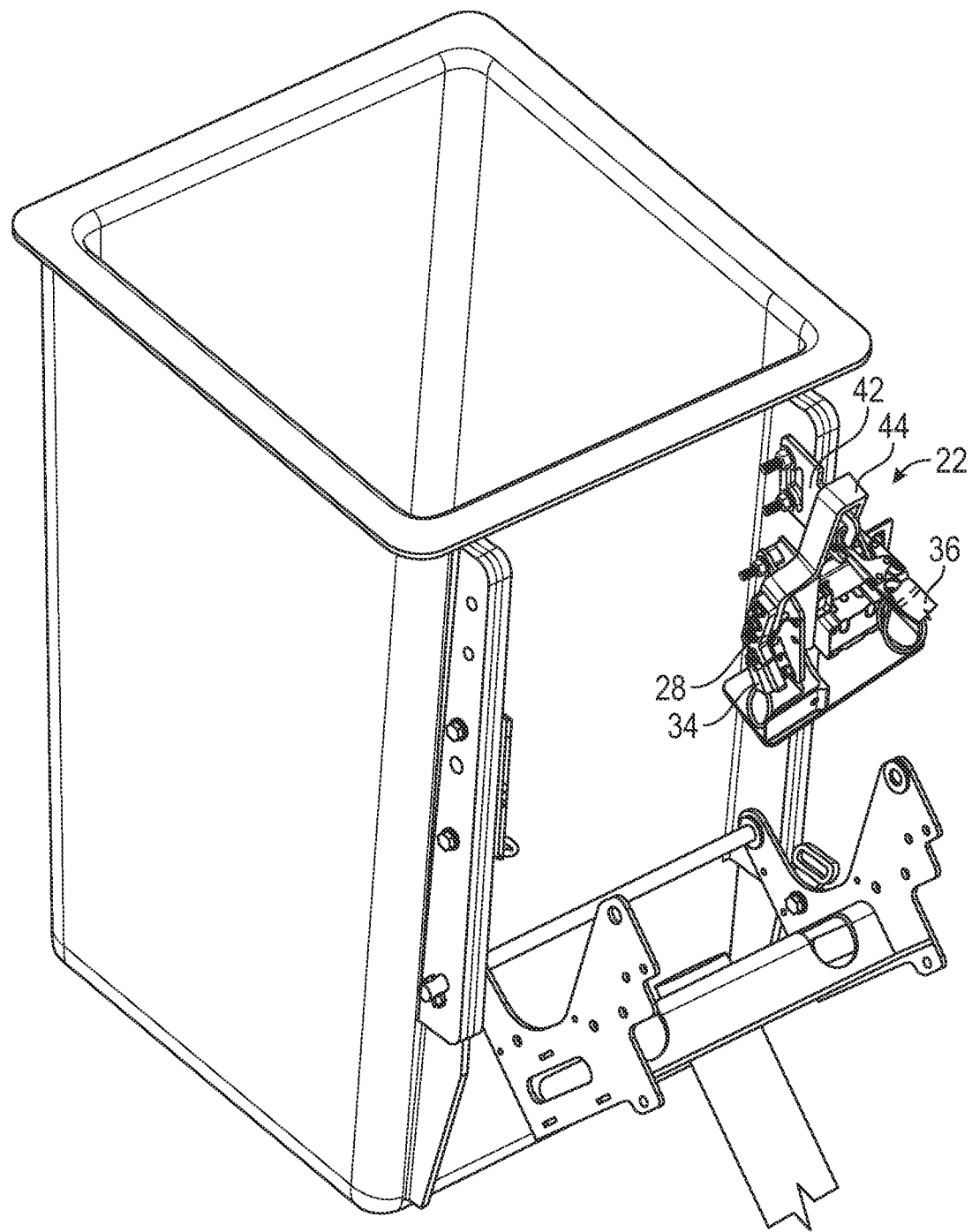

FIGS. 3A-3B depict another exemplary embodiment of lanyard detection unit 22 modified to attach to a single rib of utility platform 20 and to disable operation of the utility platform tools when the lanyard detection interlock is not satisfied (i.e., lanyard 36 is not attached). As shown in FIG. 3A, lanyard detection unit 22 comprises loop lever 44. In some embodiments, loop lever 44 fits over lanyard attachment 42. In some embodiments, loop lever 44 is connected to spring 28 that forces loop lever 44 to the open position, or first state, depicted in FIG. 3A where lanyard 36 is not attached. The operator may press loop lever 44 back into the closed position shown in FIG. 3B and attach lanyard 36 via lanyard clip 37 such that loop lever 44 remains in the second state. Sensor 34 may detect the state of loop lever 44, indicative of attachment of lanyard 36 and lanyard clip 37 and send a signal or otherwise pass a signal to the fiber optic transceiver 534 disposed at turntable 16 or utility vehicle 12. As described in embodiments above, the fiber optic transceiver 534 may then pass a signal indicative of loop lever 44 and indicative of lanyard 36 attachment to control module 536 for controlling operation of aerial device 10. As described above, the functionality of utility platform 20 may depend on both the state of lanyard detection unit 22 and single handle controller 38.

In some embodiments, in the arrangement depicted in FIGS. 3A-3B and when control selector switch 524 is set in the aerial mode position, when lanyard 36 is attached to lanyard attachment 42 and loop lever 44 is in the second state, upper control selector solenoid 542 may be enabled, allowing pilot oil to bypass the dump valve and flow to utility platform 20. As such, hydraulic actuation of utility platform 20 by operators in utility platform 20 may be enabled. If lanyard detection unit 22 is in the first state (i.e., lanyard 36 not attached), utility platform 20 may not be controlled using upper controls in utility platform 20. Furthermore, in some embodiments, control of the utility platform tools, jib functions, platform rotate and tilt may not function when lanyard 36 is not attached and lanyard detection unit 22 is in the first state. In some embodiments, the lower controls may not be affected by the state of lanyard detection unit 22.

Figure 4A:
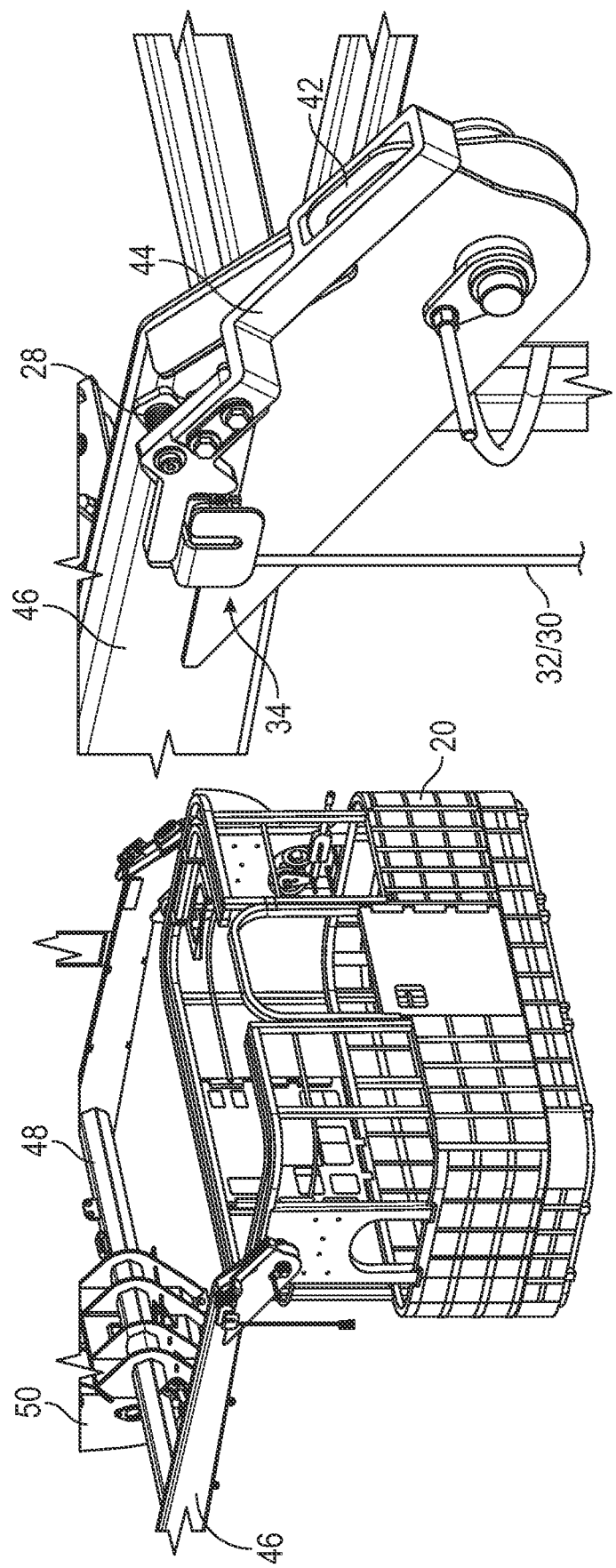
FIG. 4A-4B depict a third embodiment of a lanyard detection unit for attachment to a boom implement attachment for a crane-type aerial device.
Figure 4B:
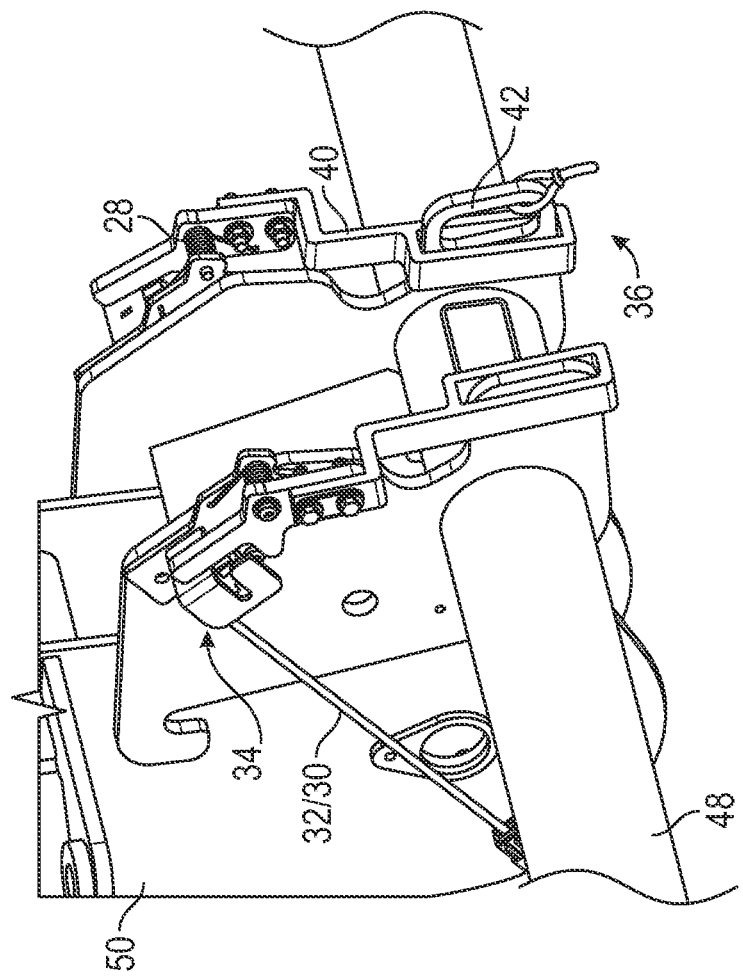
Figure 4B:
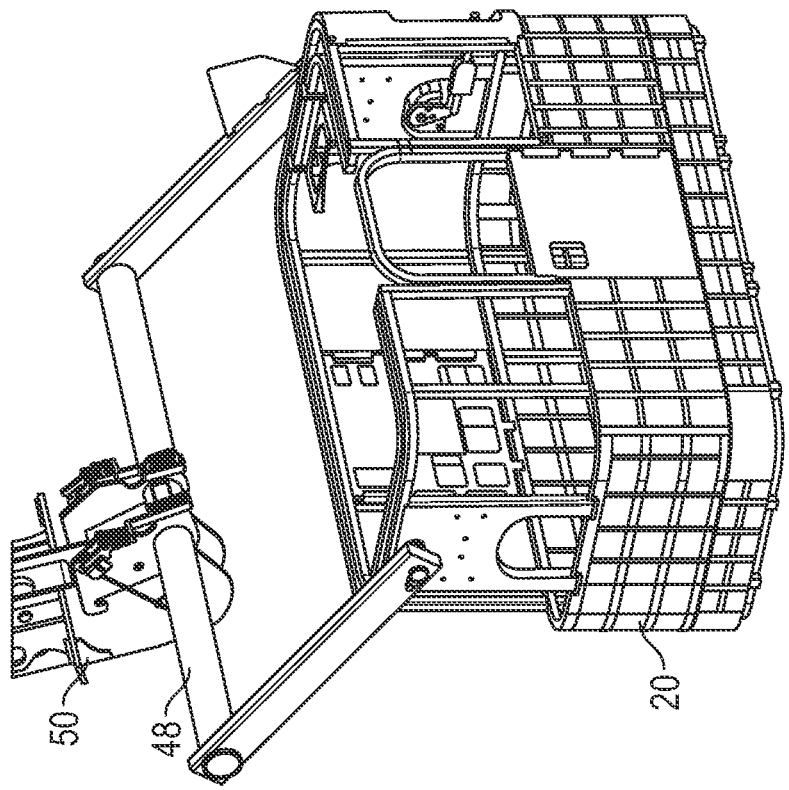

FIGS. 4A and 4B depict another exemplary embodiment of lanyard detection unit 22. In some embodiments, lanyard detection unit 22 may be used with utility platform 20 attached to boom assembly 14 where aerial device 10 is a crane. As such, utility platform 20 may be attached to the crane in a variety of ways. Furthermore, operations of utility platform 20 may be controlled by radio remote controls. The remote controls may be the active control station when the active control station is linked to a radio control receiver on aerial device 10. In the crane configuration, aerial device 10 may be switched into platform mode by accessing and verifying connection of utility platform 20 by Load Moment and Area Protection (LMAP) system. The LMAP system communicates with aerial device 10 and displays the state of aerial device 10 by receiving and interpreting on-board sensor information. The LMAP system may be used to communicate with aerial device 10 to change modes that allow use of the radio remote controls to control systems on aerial device 10. Furthermore, when the lanyard attachment device is attached to boom implement attachment 50, the aerial device may be dual rated by a regulatory body as both aerial device 10 and a crane.

FIG. 4A depicts an exemplary embodiment of lanyard detection unit 22 attached to platform attachment arm 46. Platform attachment arm 46 may be attached to cross beam 48 which may be attached to boom assembly 14 via implement attachment 50. Lanyard detection unit 22 may mechanically operate similarly as described in embodiments above. In some embodiments, lanyard detection unit 22 comprises loop lever 44 held in the first state over lanyard attachment 42 by spring 28. Loop lever 44 may be in the second state when lanyard 36 is attached to lanyard attachment 42. Furthermore, sensor 34 may detect the state of loop lever 44. As depicted in FIG. 4B, in some embodiments, lanyard detection unit 22 may be attached to implement attachment 50. In this scenario, the operation of lanyard detection unit 22 may be the same as described above in reference to FIG. 4A.

In the case that aerial device 10 is a crane, sensor 34 may communicate by Controller Area Network (CAN) bus that may control the operations of aerial device 10. In some embodiments, aerial device 10 may not include a dielectric gap and sensor 34 may be an electro-mechanical sensor and send electrical signals to the base for controlling the hydraulic operations of utility platform 20. As such, lanyard detection unit 22 may operate as described in embodiments above; however, the signals transmitted to and from sensor 34 to the base may be electrical signals. As described above, operations of utility platform 20 such as, for example, hydraulic tools and motion of utility platform 20 may be limited based on detection of the state of loop lever 44 and the state of single handle control interlock lever 40.

Figure 5B:
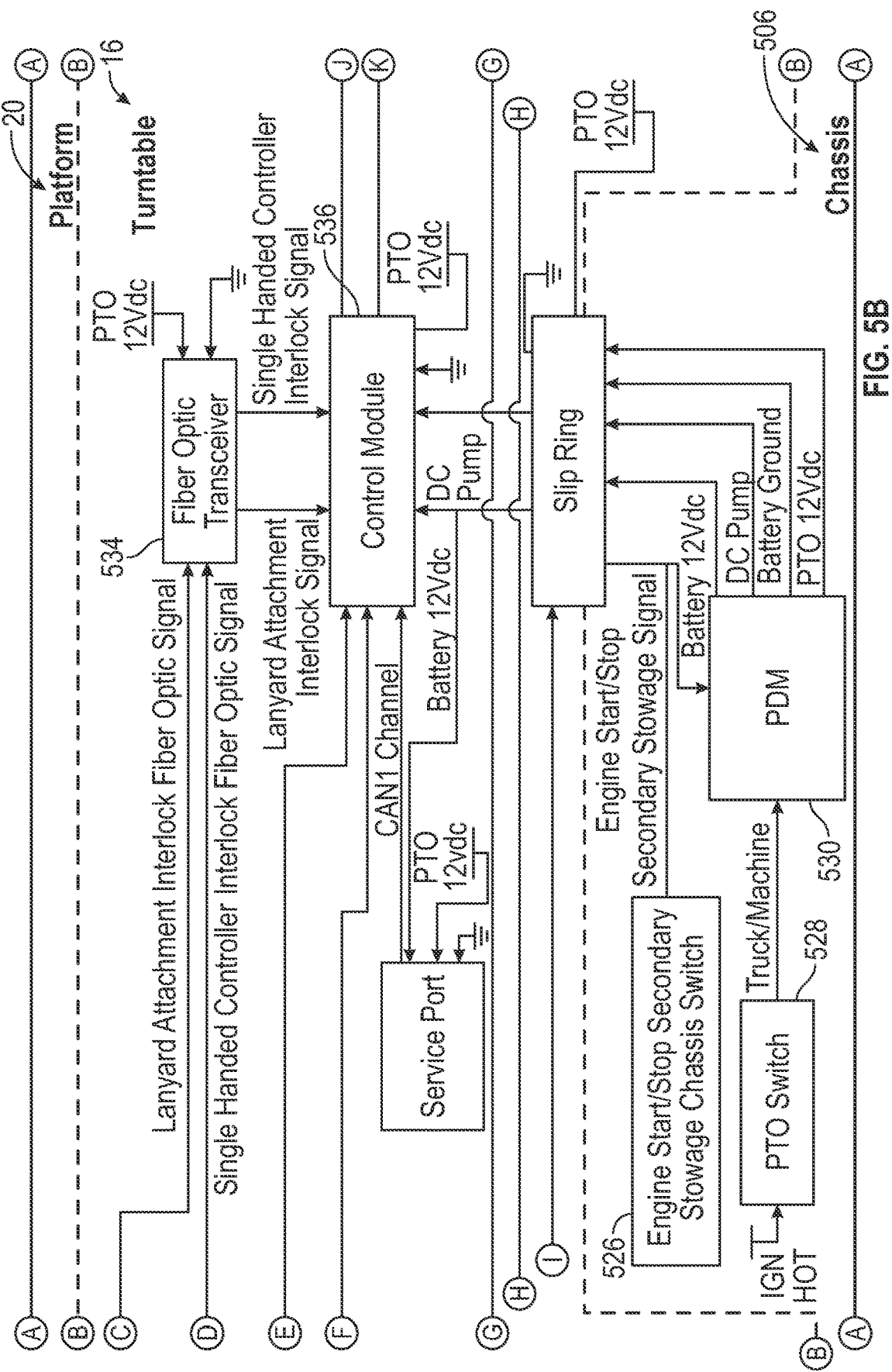
Figure 5C:
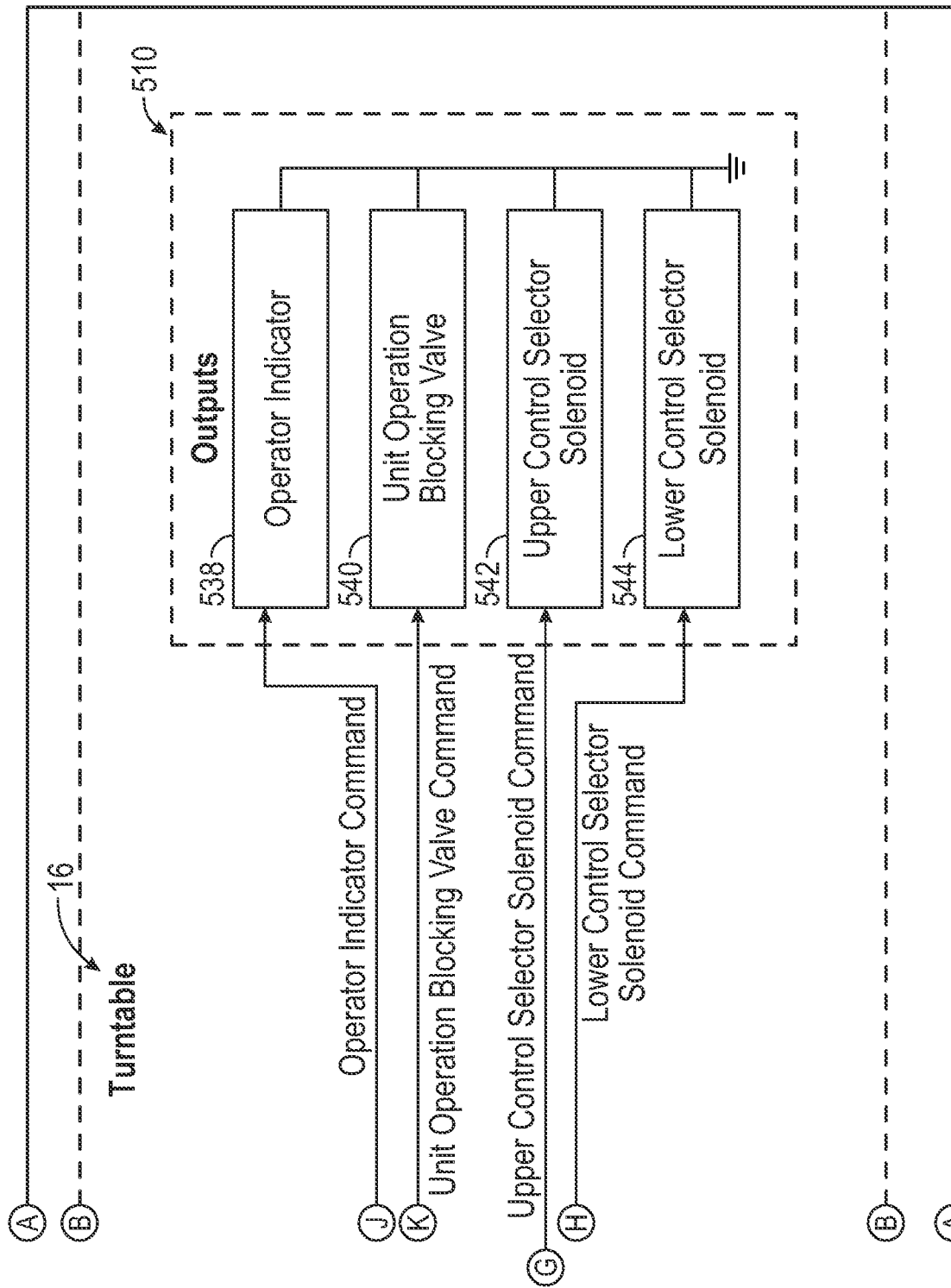

FIGS. 5A-5C depict an exemplary flow diagram 500 for implementing the methods and systems described in embodiments of the present disclosure. The flow diagram 500 is broken apart into various groups by dashed lines (B) associated with locations on aerial device 10. Utility platform 20 and turntable 16 are as described above, and chassis 506 may be the chassis of utility vehicle 12. Furthermore, inputs 508 may represent inputs for the operator and outputs 510 may represent actions initiated by the system based on inputs 508 and sensor outputs.

In some embodiments, lanyard attachment interlock fiber optic switch 512 may be sensor 34. As described in embodiments above, sensor 34 may receive a light signal from fiber optic transceiver 534 depicted in FIG. 5B. If lanyard 36 is attached to lanyard detection unit 22, sensor 34 may allow the light signal to pass and return to fiber optic transceiver 534 indicative of the attachment of lanyard 36. Furthermore, single handle controller interlock fiber optic switch 514 may receive the input from the operator at single handle control interlock lever 40. Similarly, single handle controller interlock fiber optic switch 514 may receive a light signal from fiber optic transceiver 534 and pass the signal if single handle controller interlock fiber optic switch 514 is engaged by the user. The light signal may return to fiber optic transceiver 534 indicative of engagement of single handle controller interlock fiber optic switch 514 by the operator.

A further input at utility platform 20 may be engine start/stop secondary stowage platform switch 516. When a malfunction is present in the system, such as hydraulic engine or hydraulic pump failure, the secondary stowage system may provide a backup source of hydraulic power. When engine start/stop secondary stowage platform switch 516 is engaged, pressurized air may be sent to pressure switch 518 which may trigger engine start up at chassis 506 via power distribution module (PDM) 530. In some embodiments, engine start/stop secondary stowage turntable switch 520 and engine start/stop secondary stowage chassis switch 526 may be engaged at turntable 16 and chassis 506 respectively to provide the same or similar function.

As described above, control selector switch 524 may be in the upper position signaling upper control selector solenoid 542 to allow hydraulic fluid to flow to the upper controls. In some embodiments, manual override switch 522 may be positioned at turntable 16. In some embodiments, manual override switch 522 may be held in an ON position for a minimum configurable time of, for example, 0.5 seconds. This action may activate manual override mode. Manual override mode may allow the pilot oil to flow to the lower control valves regardless of the state of lanyard detection unit 22. It may be necessary to activate single handle control interlock lever 40 to initiate motion. The manual override mode may be useful to lower utility platform 20 when a system malfunction has occurred. In various embodiments, manual override mode may be deactivated by disabling PTO 12V DC power, or chassis ignition or outrigger switch, by enabling emergency stop operating mode, or by holding the manual override switch 522 for a minimum configurable time (e.g., 0.5 seconds). In some embodiments, audible and visual signals indicate to the operator and ground crew that manual override mode is activated.

In some embodiments, any manual or stowage overrides are stored. For example, a number of the most recent override events may be stored along with date, time, sensor information, operator inputs, and any other information that may be useful. In some embodiments, about 30 events may be stored. Furthermore, the operator may provide notes on the override events that may be stored with the event data.

In some embodiments, as described above, control selector switch 524 may be operational to switch between the upper controls disposed at utility platform 20 and the lower controls disposed at turntable 16. In some embodiments, control selector switch 524 may be activated remotely. In some embodiments, switching control selector switch 524 to the upper controls may operate upper control selector solenoid 542 such that pilot oil flows to the components of the upper controls. Selection of the lower controls may operate lower control selector solenoid 544 such that pilot oil flows to the lower controls. The selection of control selector switch 524 may also be transmitted to control module 536. Lower control selector solenoid 544 and upper control selector solenoid 542 are depicted in FIG. 5C.

In some embodiments, control selector switch 524 and control module 536 operate emergency stop functionality. When control selector switch 524 is in a neutral, or middle, position (i.e., not in upper controls selection position or lower controls selection position), an emergency stop mode may be initiated. In the emergency stop position, no control station may control machine motion. Furthermore, utility platform 20 upper controls may comprise an emergency stop button that may perform the same function. In some embodiments, aerial device 10 may be a crane and may not include control selector switch 524. As such, aerial device 10 may comprise a series of emergency stop switches located on aerial device 10 and/or at the radio controller that perform the same or similar function.

In some embodiments, control module 536 comprises a processor, a data store, a transceiver, and non-transitory computer-readable media storing computer-executable instructions that, when executed by the processor, perform the methods described herein. Control module 536 may receive information indicative of the state of lanyard detection unit 22, single handle control interlock lever 40, manual override switch 522, and control selector switch 524. In some embodiments, control module 536 receives the information from inputs 508 and any other inputs by the operator as well as any sensors associated with aerial device 10. Control module 536 may output signals to control a plurality of actuators that enable and disable components of aerial device 10 by controlling solenoid valves controlling the flow of hydraulic fluid to allow motion of boom assembly 14, utility platform 20, and any controls and tools that may be operated at utility platform 20 as well as anywhere else on aerial device 10. In some embodiments, control module 536 also may control any audio and visual indicators and warning systems that may be used to alert operators of aerial device 10. In some embodiments, any sensor data and operator activities may be detected and stored for future evaluation.

Control module 536 may process the sensor and operator inputs and send signals to outputs 510 depicted in FIG. 5C. In some embodiments, outputs 510 may comprise operator indicator 538 and unit operation blocking valve 540. Control module 536 may receive an input from the operator that is not allowed or receive a signal from a sensor that a system is malfunctioning. Consequently, control module 536 may send a signal to one of a plurality of indicators represented by operator indicator 538. The plurality of indicators may be located on utility platform 20, turntable 16, and chassis 506. For example, the operator may attempt to control utility platform 20 without attaching lanyard 36 to lanyard detection unit 22. Control module 536 may receive a signal that the operator is attempting to move utility platform 20 but also receive indication via lanyard attachment interlock fiber optic switch 512 that lanyard 36 is not attached. As such, unit operation blocking valve 540 may be engaged preventing the operator from moving utility platform 20 and an alert may be sent to an indicator at utility platform 20, turntable 16, and chassis 506 warning any operators that lanyard 36 is not attached and that movement of utility platform 20 is not possible without a manual override.

Furthermore, in some embodiments, control module 536 may receive a mode change of aerial device 10 such as, for example, a change from lower controls to upper controls, a change from crane made to aerial mode, a system startup action, or any other mode change of aerial device 10. Control module 536 may check sensor 34 (e.g., lanyard attachment interlock fiber optic switch 512) based on the anti-tie down logic and determine that either lanyard 36 or sensor 34 is malfunctioning, or on object may be obstructing lever 26. Consequently, control module 536 may send a signal to operator indicator 538 to notify aerial device operators at any location on aerial device 10. Furthermore, sensor data, time date, operator inputs, mode, and any other information may be stored for future review and analysis.

In some embodiments, control module 536 may implement anti-tie-down logic. The anti-tie-down logic may be used to detect if lanyard detection unit 22 is in the second state at startup and during mode change operations. The inputs that pass through anti-tie-down logic are at least one of lanyard attachment interlock fiber optic switch 512, single handle controller interlock fiber optic switch 514, manual override switch 522, engine start/stop secondary stowage turntable switch 520, engine start/stop secondary stowage platform switch 516, and engine start/stop secondary stowage chassis switch 526. In some embodiments, when aerial device 10 and/or outrigger/utility platform 20 are activated by a key switch, button, or by remote control, and when a mode change of aerial device 10 occurs, the anti-tie-down functionality checks the output of sensor 34 for the state of lanyard detection unit 22 as well as the other necessary inputs listed above. If lever 26 or loop lever 44 are not in the neutral position (i.e., detecting attachment), operation of the utility platform 20 may be prevented. Furthermore, audio and visual alarms and indicators may be activated to show the operators that the aerial device 10 is in the anti-tie-down mode. Information such as, for example, date, time, sensor data, operator inputs, and the like may be monitored and stored when anti-tie-down mode is initiated, and/or any other time.

In some embodiments, control module 536 may also receive direct current (DC) pump for controlling override operations and transmit and receive system state information through a service port. Furthermore, control module 536 may comprise a transmitter and receiver for transmitting and receiving information wirelessly. In some embodiments, control module 536 may comprises a server and may be capable of local area network and non-local communication.

Figure 6:
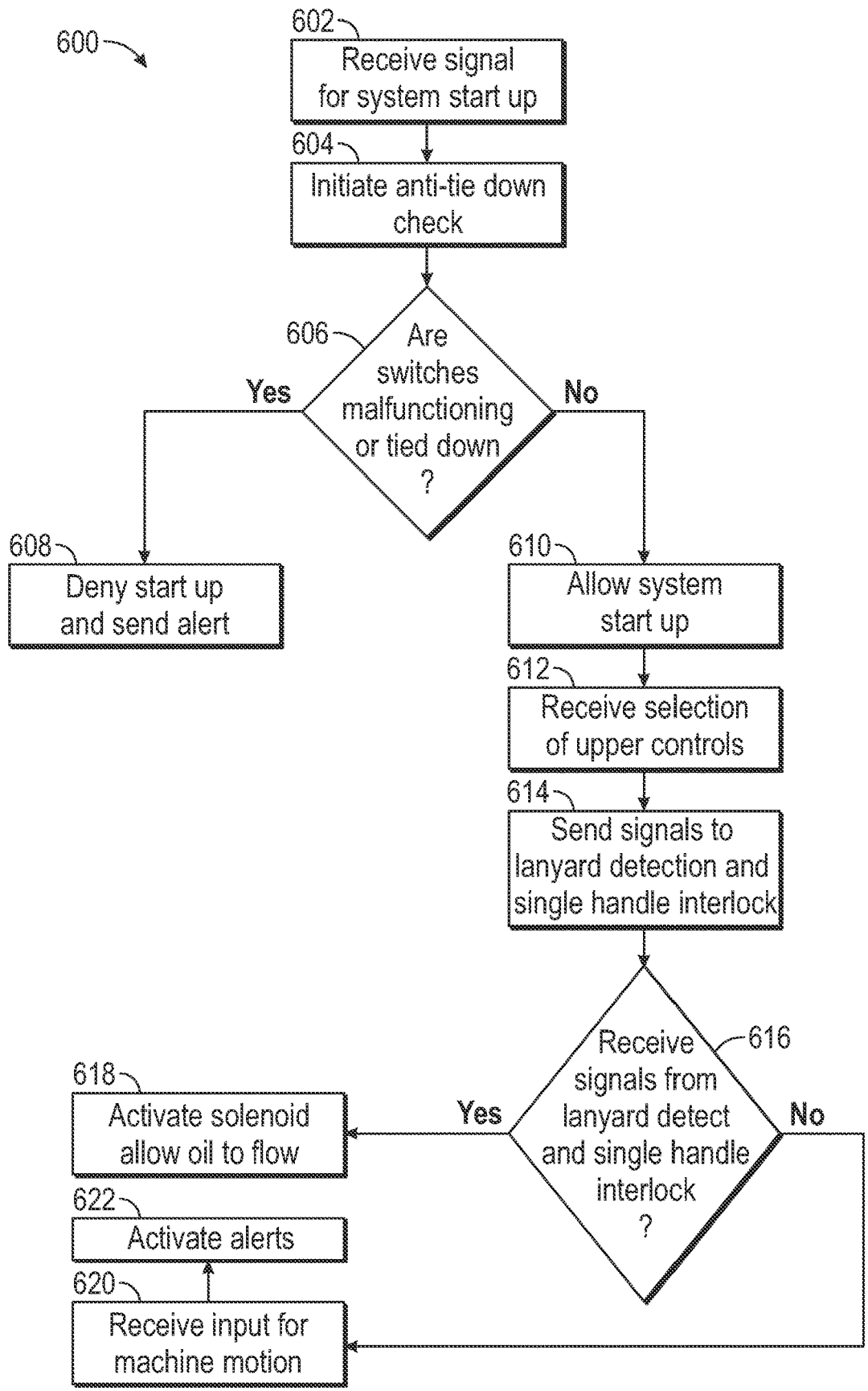
FIG. 6 depicts an embodiment of a method of operating a utility platform of an aerial device with a lanyard detection unit.

FIG. 6 depicts an exemplary method for operation of aerial device 10 and detecting the state of lanyard detection unit 22 generally referenced by numeral 600. At step 602 a startup signal may be received from the operator. The startup signal may be initiated by the operator of aerial device 10 at chassis 506, turntable 16, utility platform 20, or remote control. The startup signal may activate the electronics of aerial device 10, and consequently, activate system check logic such as the anti-tie-down functionality.

At step 604, the anti-tie-down functionality may be processed. The startup operation may send a signal indicative of startup to a processor which may be control module 536. Control module 536 may access computer-executable instructions to receive and check signals from sensors and inputs as described above. At step 606, the system determines if lanyard detection system is in the first state or the second state by receiving the signals from the sensors, such as fiber optic sensors or electromechanical sensors, as described above.

As described above, at step 608, if the anti-tie-down functionality detects that lanyard detection unit 22 is in the second state, certain operations of aerial device 10 may be disabled and/or audio, visual, and/or text alerts may be activated. Any controls for operating utility platform 20 may be disabled including controls at turntable 16, utility platform 20, and radio controls may be switch off and only aerial device 10 mounted controls may be used. In some embodiments, controls at turntable 16 may still be operational. Furthermore, if override operations described herein are initiated, the motion prevention may be overridden.

At step 610, the system may determine that lanyard detection unit 22 is in the first state and that everything in the system is operational and consequently, allows operation of utility platform 20. At step 612, input to cause motion of utility platform 20 may be received by the operator on utility platform 20. Operation of utility platform 20 may depend on at least three system states. The first state of aerial device 10 that may need to be satisfied is of control selector switch 524. Control selector switch 524 may be set to upper controls and then upper control selector solenoid 542 may be actuated to allow oil to flow to the upper platform controls to allow motion of utility platform 20. In some embodiments, such as in crane-style aerial devices, control selector switch 524 may not be present. As such, radio controls and on-unit controls may be mutually exclusive, only allowing one to be operational at a time.

At step 614, signals, such as light signals, may be sent from fiber optic transceiver 534 to sensor 34 which may be lanyard attachment interlock fiber optic switch 512. Furthermore, light signals may be sent from fiber optic transceiver 534 to single handle controller interlock fiber optic switch 514, which detects the state of single handle control interlock lever 40. In some embodiments, the light signals may be blocked when the interlocks are not engaged, or vice versa. Either way, receiving the light signal is indicative of the state of the attachment of lanyard 36 and the state of single handle control interlock lever 40. It may be determined by control module 536 when signals are received at step 616. As such, at step 618, when the light signals pass lanyard attachment interlock fiber optic switch 512 and single handle controller interlock fiber optic switch 514, and is received at fiber optic transceiver 534, the hydraulic fluid flow to the upper controls is not blocked and the operator may control motion of utility platform 20 if receiving the light signal is indicative of engagement of single handle control interlock lever 40 and indicative of lanyard 36 attachment. Alternatively, if the light signals are not received at fiber optic transceiver 534 (i.e., single handle control interlock lever 40 is not engaged and lanyard 36 is not attached), the process proceeds to step 620.

At step 620, when input to move utility platform 20 is received at utility platform 20 by the operator and either lanyard attachment interlock fiber optic switch 512 or single handle controller interlock fiber optic switch 514 are not satisfied, the oil to utility platform controls (i.e., upper controls) is blocked, and utility platform 20 may not be operated by the operator in utility platform 20. In some embodiments, this does not affect lower controls, and operators on turntable 16 may still move utility platform 20. In some embodiments, utility platform 20 hydraulic tools, as well as rotate and tilt of utility platform 20, may be operational as described above. Alternatively, in some embodiments, utility platform 20 hydraulic tools, as well as rotate and tilt of utility platform 20, may not be operational.

At step 622, in some embodiments, when the operator attempts to move utility platform 20 while lanyard 36 is not attached, alerts may be sent to indicators to warn the operator and ground crew that lanyard 36 is not attached. In some embodiments, the alerts may be any of audio, visual, and/or messages sent online or cellularly. The alerts may be provided anywhere that indicators are present on aerial device 10 and on the remote control.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A system for detecting an attachment of a lanyard at a utility platform of an aerial device, the system comprising:
    a processor;
    a lanyard attachment device comprising:
        a moveable element; and
        a sensor connected to the moveable element for detecting a state of the moveable element;
        wherein the moveable element is in a first state when the lanyard is not attached to the lanyard attachment device, and the moveable element is in a second state when the lanyard is attached to the lanyard attachment device; and one or more non-transitory computer-readable media storing computer-executable instructions that, when executed by the processor, perform a method of detecting the state of the moveable element, the method comprising the steps of:
receiving a first signal from the sensor indicative of the state of the moveable element; and
transmitting a second signal to at least one actuator for controlling flow of a hydraulic fluid to control the utility platform based on the first signal indicative of the state of the moveable element.

2. The system of claim 1,
wherein the sensor is a first fiber optic switch,
wherein the first signal is a light signal,
wherein transmission of the first signal is accomplished by the first fiber optic switch actuating to allow the light signal to pass from a fiber optic transceiver disposed near a base of the aerial device through the first fiber optic switch and back to the fiber optic transceiver, and
wherein a receipt of the first signal is indicative of either the first state of the moveable element or the second state of the moveable element.

3. The system of claim 2, further comprising:
a second fiber optic switch for detecting engagement of a single handle control moveable part,
wherein the hydraulic fluid flows to the utility platform when the first fiber optic switch is indicative of the second state of the moveable element and the second fiber optic switch is indicative of engagement of the single handle control moveable part.

4. The system of claim 1, wherein when the lanyard is attached to the lanyard attachment device, the moveable element is moved from the first state to the second state against a force provided by a spring, thereby triggering the sensor to send the first signal, and
wherein when the lanyard is not attached to the lanyard attachment device, the spring restores the moveable element to the first state.

5. The system of claim 1, wherein if the lanyard is attached to a boom implement attachment, the sensor is an electromechanical switch and the hydraulic fluid flows to the utility platform when the moveable element is in the second state.

6. The system of claim 1, further comprising:
an alarm, wherein the alarm is activated when actuation of a utility platform motion input or aerial device mode change is received while the moveable element is in the first state.

7. The system of claim 1, wherein when an input of at least one of a key switch, an outrigger selection, and an aerial unit selection, is received, the input is not allowed when the moveable element is in the first state.

8. The system of claim 1, further comprising one or more manual override switches that, when activated by an operator, allow the hydraulic fluid to flow to the utility platform when the moveable element is in the first state.

9. A method for detecting attachment of a lanyard at a utility platform of an aerial device, the method comprising the steps of:
receiving a first signal at a base of the aerial device from the utility platform,
wherein the first signal is indicative of a state of a moveable element disposed at the utility platform,
wherein the moveable element is in a first state when the lanyard is not attached to a lanyard attachment device and the moveable element is in a second state when the lanyard is attached to the lanyard attachment device; and
transmitting a second signal to at least one actuator for controlling flow of a hydraulic fluid to control the utility platform based on the first signal indicative of the state of the moveable element.

10. The method of claim 9, further comprising:
receiving the first signal from a first fiber optic switch, wherein the first signal is a light signal; and
actuating the fiber optic switch causing the light signal to pass from a fiber optic transceiver disposed at a base of the aerial device through the fiber optic switch and back to the fiber optic transceiver,
wherein receipt of the first signal is indicative of either the first state of the moveable element or the second state of the moveable element.

11. The method of claim 10, further comprising:
detecting engagement of a single handle control moveable part; and
causing the hydraulic fluid to flow to the utility platform when the first fiber optic switch is indicative of the second state of the moveable element and a second fiber optic switch is indicative of engagement of the single handle control moveable part.

12. The method of claim 9, further comprising:
triggering a sensor to send the first signal when the moveable element is moved to the second state against a force provided by a spring, and
restoring the movable element to the first state by the spring when the lanyard is removed from the lanyard attachment device.

13. The method of claim 9, wherein if the lanyard is attached to a boom implement attachment,
receiving the first signal from an electromechanical switch and allowing the hydraulic fluid to flow to the utility platform when the moveable element is in the second state.

14. The method of claim 9, further comprising:
receiving actuation of a utility platform motion input or aerial device mode change while the moveable element is in the first state; and
activating an alarm based on receiving the actuation of the utility platform motion input.

15. The method of claim 9, further comprising:
receiving an input of at least one of a key switch, an outrigger selection, and an aerial unit selection; and
denying the input when the moveable element is in the first state.

16. The method of claim 9, further comprising:
receiving a manual override input by a manual override switch; and
causing the hydraulic fluid to flow to the utility platform when the moveable element is in the first state.

17. A system for detecting attachment of a lanyard at a utility platform of an aerial device, the system comprising:
a processor;
a lanyard attachment device comprising:
a moveable element; and
a first sensor connected to the moveable element detecting a movable element state,
wherein the moveable element is in a first state when the lanyard is not attached to the lanyard attachment device, and the moveable element is in a second state when the lanyard is attached to the lanyard attachment device;

a single handle controller;

a second sensor detecting a single handle control state; and one or more non-transitory computer-readable media storing computer-executable instructions that, when executed by the processor, perform a method of detecting the moveable element state and the single handle control state, the method comprising the steps of:

receiving a first signal from the first sensor indicative of the moveable element state;

receiving a second signal from the second sensor indicative of the single handle control state; and transmitting a third signal to at least one actuator for controlling flow of a hydraulic fluid to control the utility platform based on the first signal and the second signal.

18. The system of claim 17, wherein the first sensor is a first fiber optic switch, wherein the second sensor is a second fiber optic switch, wherein the computer-executable instructions are further executed to perform the steps of:

actuating the first fiber optic switch to allow a first light signal to pass from a fiber optic transceiver disposed near a base of the aerial device through the first fiber optic switch and back to the fiber optic transceiver; and actuating the second fiber optic switch to allow a second light signal to pass from the fiber optic transceiver disposed near the base of the aerial device through the second fiber optic switch and back to the fiber optic transceiver.

19. The system of claim 17, wherein the lanyard attachment device is attached to either the utility platform or a boom implement attachment, wherein the first sensor is a first electromechanical sensor, and wherein the second sensor is a second electromechanical sensor.

20. The system of claim 17, further comprising at least one alarm, wherein the at least one alarm is activated when actuation of a utility platform motion input or aerial device mode change is received while the moveable element is in the first state.

* * * * *